United States Patent
Raybin et al.

(10) Patent No.: US 11,654,740 B2
(45) Date of Patent: May 23, 2023

(54) DATA INTEGRITY OF VERIFICATION DATA FOR A TRANSPORT CLIMATE CONTROL SYSTEM

(71) Applicant: THERMO KING LLC, Minneapolis, MN (US)

(72) Inventors: Adam Howard Raybin, Burnsville, MN (US); Shawn Alan Schemmel, Prior Lake, MN (US); Oscar Sanz de Acedo Pollan, Pamplona (ES); Niall Lynch, Galway (IE)

(73) Assignee: THERMO KING LLC, Minneapolis, MN (US)

( * ) Notice: Subject to any disclaimer, the term of this patent is extended or adjusted under 35 U.S.C. 154(b) by 326 days.

(21) Appl. No.: 16/863,095

(22) Filed: Apr. 30, 2020

(65) Prior Publication Data

US 2021/0339600 A1 Nov. 4, 2021

(51) Int. Cl.
*G06Q 50/30* (2012.01)
*B60H 1/32* (2006.01)
(Continued)

(52) U.S. Cl.
CPC ..... *B60H 1/00014* (2013.01); *B60H 1/00735* (2013.01); *B60H 1/3232* (2013.01); *G06Q 10/0832* (2013.01); *G06Q 50/30* (2013.01)

(58) Field of Classification Search
CPC ............ B60H 1/00014; B60H 1/00364; B60H 1/00735; B60H 1/3232; G06Q 10/00832; G06Q 10/0833; G06Q 50/30; Y04S 20/12
See application file for complete search history.

(56) References Cited

U.S. PATENT DOCUMENTS

2008/0282715 A1* 11/2008 Aue .................. F24F 11/83
62/159
2010/0274604 A1* 10/2010 Crilly ................ G06Q 10/0833
62/239

(Continued)

FOREIGN PATENT DOCUMENTS

EP 2613617 7/2013
EP 3626489 3/2020
(Continued)

OTHER PUBLICATIONS

Extended European Search Report, issued in the corresponding European patent application No. 21170451.5, dated Sep. 21, 2021, 8 pages.

*Primary Examiner* — Eric S Ruppert
*Assistant Examiner* — Hans R Weiland
(74) *Attorney, Agent, or Firm* — Hamre, Schumann, Mueller & Larson, P.C.

(57) ABSTRACT

A controller for a transport climate control system is provided. The controller includes a main processor, a co-processor and a verification memory. The main processor is configured to control operation of a compressor of the transport climate control system. The co-processor is separate from the main processor. The verification memory is connected in electronic communication with only the co-processor and is not in electronic communication with the main processor. The co-processor is configured to receive verification data from an independent sensor and wherein the independent sensor is not in communication with the main processor.

17 Claims, 6 Drawing Sheets

(51) Int. Cl.
*B60H 1/00* (2006.01)
*G06Q 10/0832* (2023.01)

(56) References Cited

U.S. PATENT DOCUMENTS

| | | | |
|---|---|---|---|
| 2014/0148975 A1* | 5/2014 | Self | B60H 1/00778 701/2 |
| 2014/0288868 A1* | 9/2014 | Gorham, Jr. | G06Q 10/0833 235/376 |
| 2016/0034846 A1* | 2/2016 | West | G06Q 10/0833 705/333 |
| 2016/0260059 A1* | 9/2016 | Benjamin | G06Q 10/0833 |
| 2016/0280040 A1* | 9/2016 | Connell | B60H 1/00771 |
| 2017/0311457 A1 | 10/2017 | Kubota et al. | |
| 2019/0049926 A1* | 2/2019 | Beasley | G06Q 10/0832 |
| 2019/0250653 A1* | 8/2019 | Conlon | G06Q 10/0832 |
| 2020/0053900 A1 | 2/2020 | Feurtado et al. | |

FOREIGN PATENT DOCUMENTS

| | | |
|---|---|---|
| WO | 2016/145107 | 9/2016 |
| WO | 2018/0017825 | 1/2018 |
| WO | 2019/131071 | 7/2019 |

\* cited by examiner

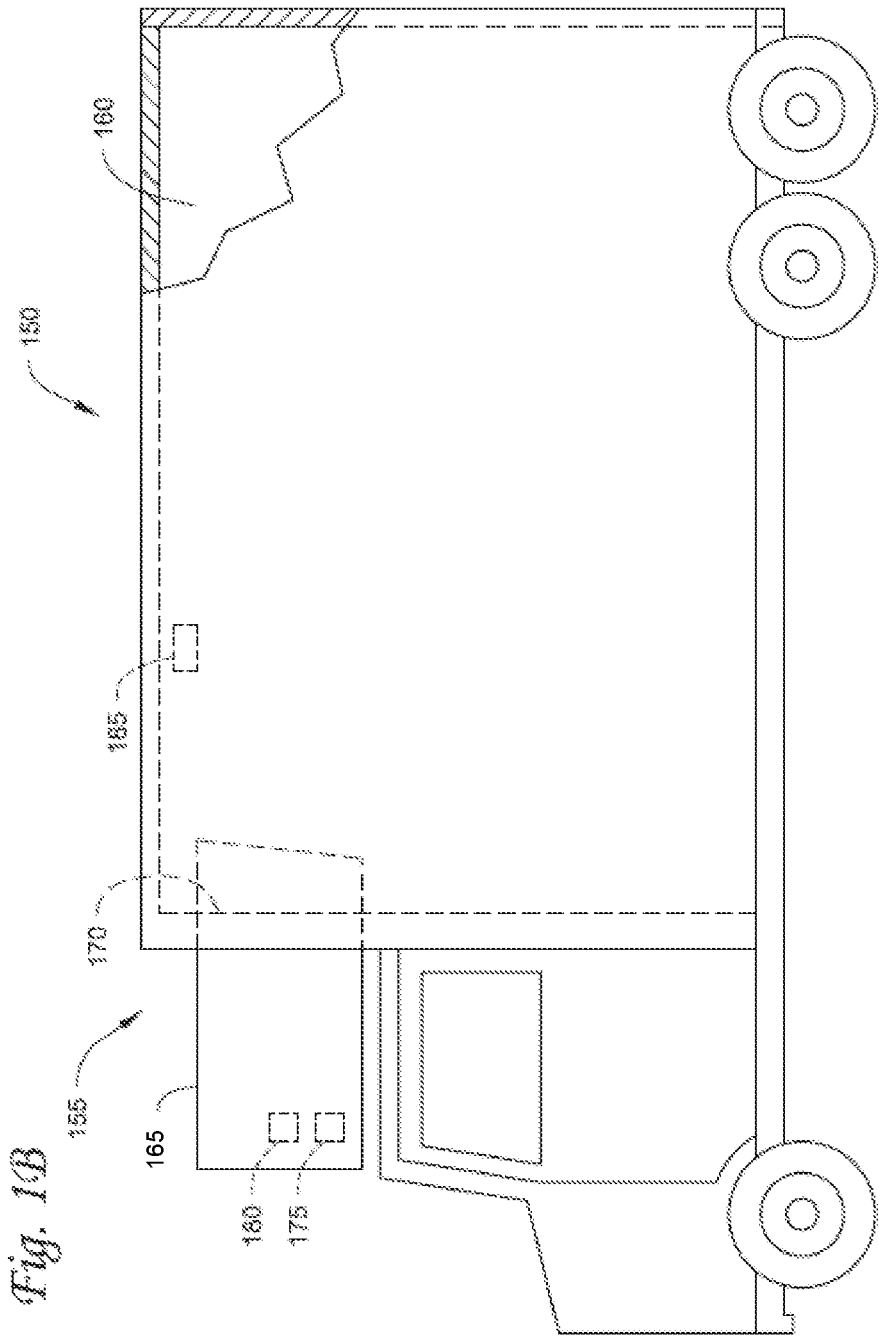

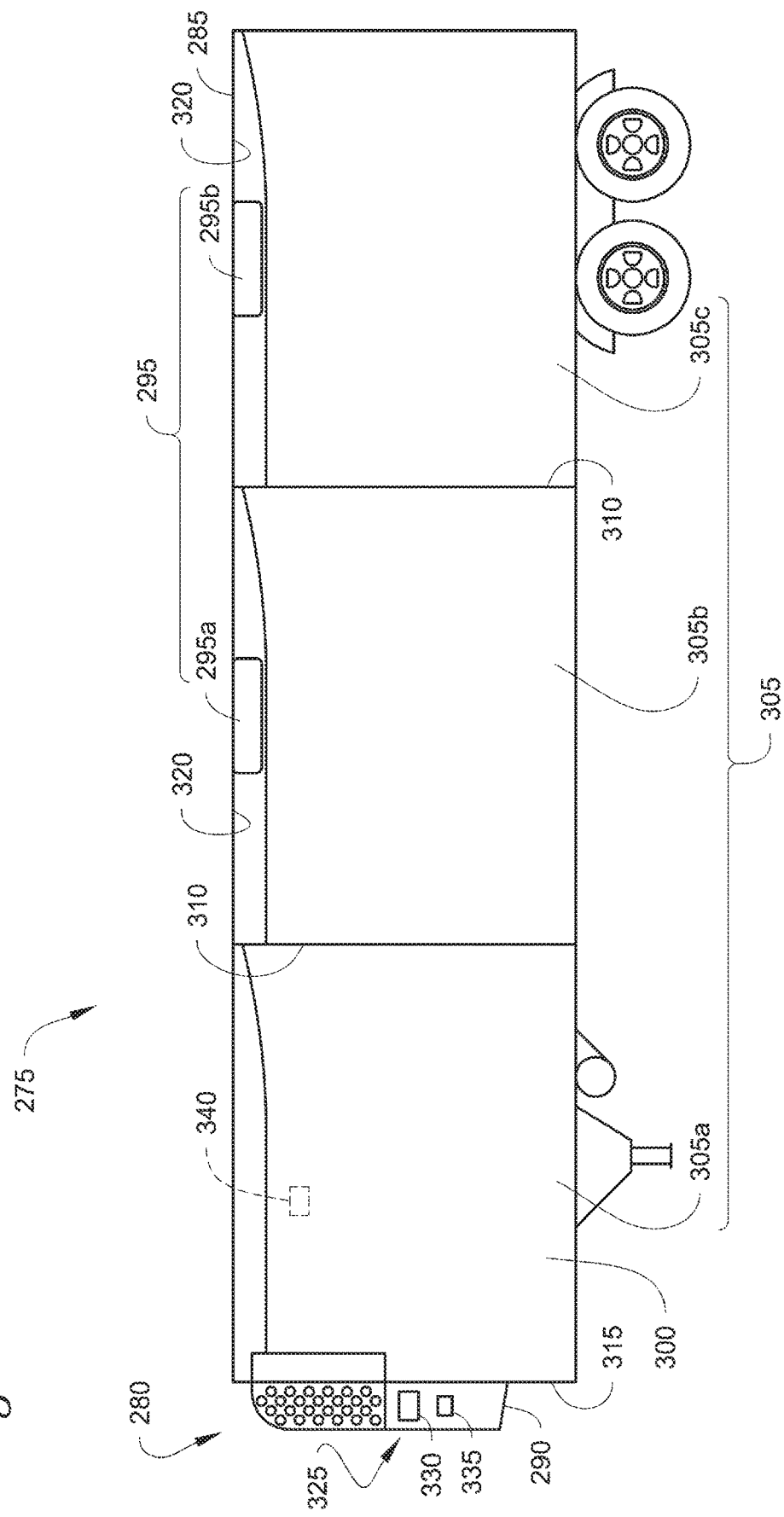

DATA INTEGRITY OF VERIFICATION DATA FOR A TRANSPORT CLIMATE CONTROL SYSTEM

FIELD

This disclosure relates generally to a transport climate control system. More specifically, this disclosure relates to data integrity of verification data for a transport climate control system.

BACKGROUND

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, etc.), a box car, a semi-tractor, a bus, or other similar transport unit. A refrigerated transport unit is commonly used to transport perishable items such as produce, frozen foods, and meat products.

SUMMARY

This disclosure relates generally to a transport climate control system. More specifically, this disclosure relates to data integrity of verification data for a transport climate control system.

The embodiments described herein can ensure that verification data (e.g., temperature data) can be stored and transmitted so as to meet, for example, regulatory compliance requirements. For example, European Regulation EN-12830 requires an independent data logger for verification of temperature control while in transport. In particular, the regulation can require a data logger to provide evidence that the verification data has not been corrupted or changed (intentionally or unintentionally) in the chain from measurement to transmission outside of the transport unit. The embodiments described herein can ensure data integrity so as to meet regulatory compliance requirement(s).

Accordingly, the embodiments described herein provide a main application controller with an integrated data logger that can separately and independently obtain verification data within a transport unit from the rest of the main application controller. This can remove costs associated with having to provide an additional hardware module (i.e., data logger) that is separate from the main application controller in order to meet the regulatory compliance requirement.

In one embodiment, a controller for a transport climate control system is provided. The controller includes a main processor, a co-processor and a verification memory. The main processor is configured to control operation of a compressor of the transport climate control system. The co-processor is separate from the main processor. The verification memory is connected in electronic communication with only the co-processor and is not in electronic communication with the main processor. The co-processor is configured to receive verification data from an independent sensor and wherein the independent sensor is not in communication with the main processor.

In another embodiment, a transport climate control system that provides climate control to a climate controlled space of a transport unit is provided. The system includes a compressor, a plurality of sensors, and a controller. The plurality of sensors includes a climate control sensor and an independent sensor. The controller includes a main processor configured to control operation of the compressor of the transport climate control system, a co-processor separate from the main processor, and a verification memory connected in electronic communication with only the co-processor of the co-processor and not in electronic communication with the main processor. The co-processor is configured to receive verification data from the independent sensor and the independent sensor is not in communication with the main processor.

BRIEF DESCRIPTION OF THE DRAWINGS

References are made to the accompanying drawings that form a part of this disclosure, and which illustrate embodiments in which the systems and methods described in this Specification can be practiced.

FIG. 1B is a side view of a truck with a transport climate control system, according to an embodiment.

FIG. 1D is a side view of a climate controlled transport unit including a multi-zone transport climate control system, according to an embodiment.

Like reference numbers represent like parts throughout.

DETAILED DESCRIPTION

Figure 1A:
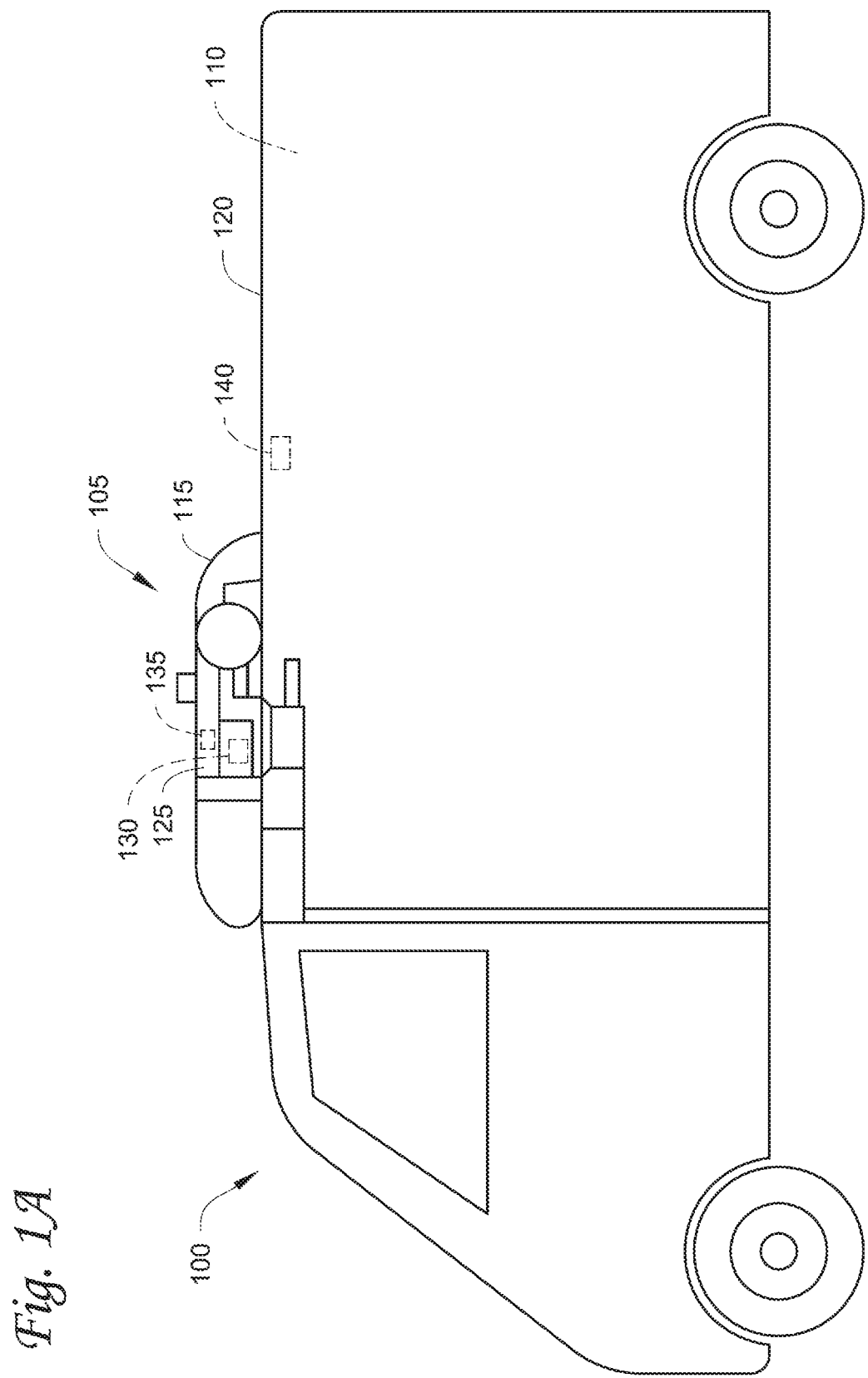
FIG. 1A is a side view of a van with a transport climate control system, according to an embodiment.

This disclosure relates generally to a transport climate control system. More specifically, this disclosure relates to data integrity of verification data for a transport climate control system.

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, etc.), a box car, a semi-tractor, a bus, or other similar transport unit. A refrigerated transport unit is commonly used to transport perishable items such as produce, frozen foods, and meat products.

When transporting temperature sensitive goods, it may be beneficial (or even required) to monitor temperatures within the transport unit to ensure the goods are being maintained within appropriate ranges and not at risk of spoiling. In some locations, such as Europe, there are standards that require the monitoring of the temperatures within the transport unit during transport. To ensure that these temperatures are properly tracked and maintained, some of the regulations can require independent temperature sensors and data loggers that are separate from the climate control sensors and control system of the transport climate control system to ensure integrity of the verification data obtained from the independent temperature sensors. For example, in Europe, the EN12830 standard requires the temperatures be monitored and that hardware and software for the temperature monitoring be maintained separately from the hardware and software that is controlling the transport climate control system.

In some instances, the division of this hardware and software can result in additional hardware components to the transport climate control system. Embodiments of this disclosure are directed to a system that includes a separate co-processor within the programmable climate controller of the transport climate control system. As a result, requirements of the separation can be met in addition to requirements of monitoring.

A transport unit includes, for example, a truck, a container (such as a container on a flat car, an intermodal container, a marine container, etc.), a box car, a semi-tractor, a bus, or other similar transport unit. Embodiments of this disclosure may be used in any suitable environmentally controlled transport unit.

A climate controlled transport unit (e.g., a transport unit including a climate control system) can be used to transport perishable items such as, but not limited to, produce, frozen foods, and meat products.

A climate control system is generally used to control one or more environmental conditions such as, but not limited to, temperature, humidity, and/or air quality of a transport unit. A climate control system includes, for example, a refrigeration system for controlling the refrigeration of a climate controlled space of a refrigerated transport unit. The climate control system may include a vapor-compressor type refrigeration system, a thermal accumulator type system, or any other suitable refrigeration system that can use refrigerant, cold plate technology, or the like.

A climate control system can include a climate control unit (CCU) attached to a transport unit to control one or more environmental conditions (e.g., temperature, humidity, air quality, etc.) of a climate controlled space of the refrigerated transport unit. The CCU can include, without limitation, a compressor, a condenser, an expansion valve, an evaporator, and one or more fans or blowers to control the heat exchange between the air within the climate controlled space and the ambient air outside of the refrigerated transport unit.

Figure 1C:
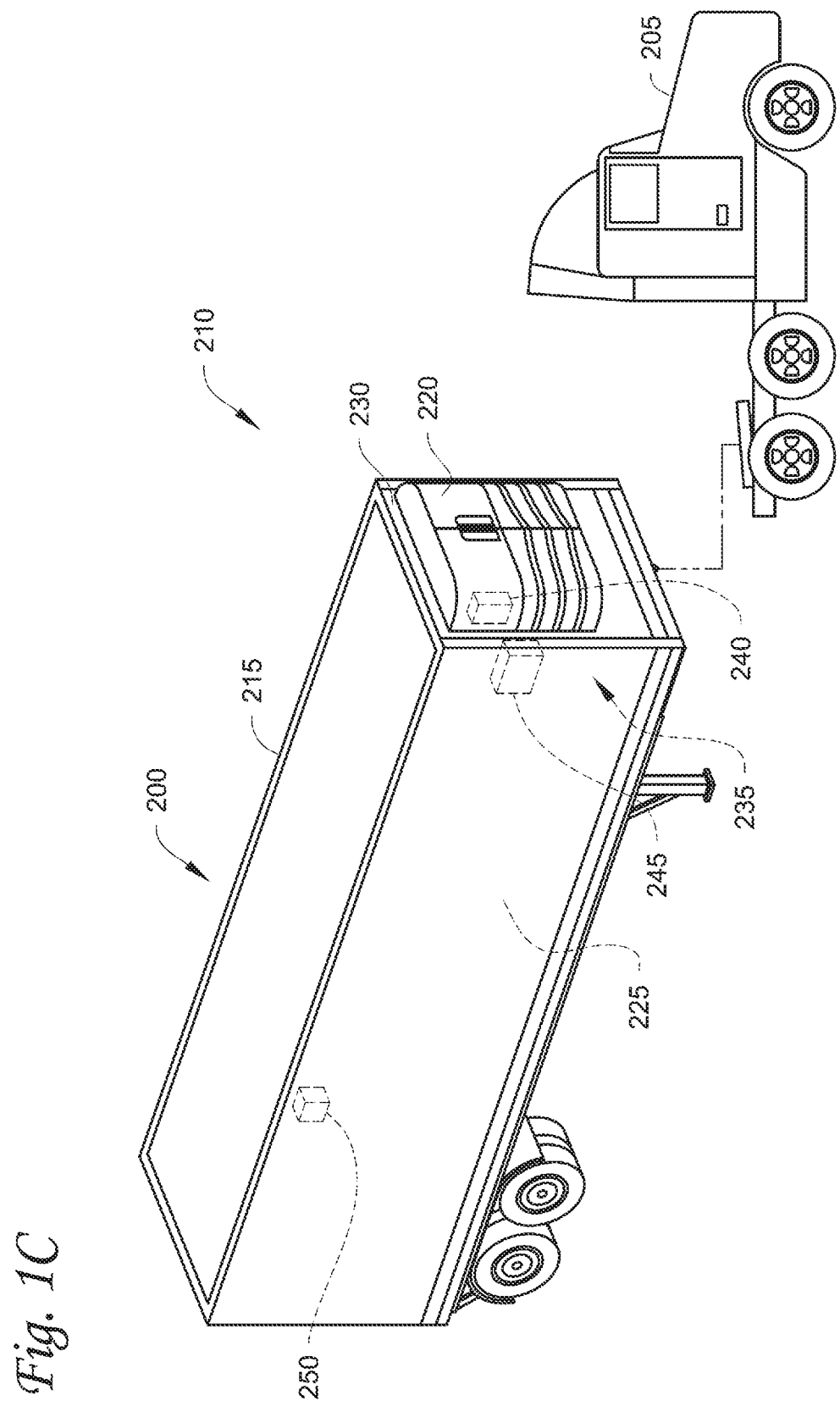
FIG. 1C is a perspective view of a climate controlled transport unit, according to an embodiment.

FIGS. 1A-1D show various transport climate control systems. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate controlled transport unit 200 attachable to a tractor 205, according to an embodiment. The climate controlled transport unit 200 includes a transport climate control system 210. FIG. 1D is a side view of a climate controlled transport unit 275 including a multi-zone transport climate control system 280, according to an embodiment.

FIG. 1A depicts the van 100 having the climate control system 105 for providing climate control within a climate controlled space 110. The transport climate control system 105 includes a climate control unit (CCU) 115 that is mounted to a rooftop 120 of the van 100. In an embodiment, the CCU 115 can be a transport refrigeration unit.

The transport climate control system 105 can include, among other components, a climate control circuit (see FIG. 2) that connects, for example, a compressor, a condenser, an evaporator, and an expansion device (e.g., an expansion valve) to provide climate control within the climate controlled space 110. It will be appreciated that the embodiments described are not limited to vans or climate-controlled vans, but can apply to any type of transport unit (e.g., a truck, a container (such as a container on a flat car, an intermodal container, a marine container, etc.), a box car, a semi-tractor, a bus, or other similar transport unit), within the scope of the principles of this disclosure.

The transport climate control system 105 also includes a programmable climate controller 125 and one or more climate control sensors (not shown) that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors can be positioned at various locations outside the van 100 and/or inside the van 100 (including within the climate controlled space 110).

The climate controller 125 is configured to control operation of the transport climate control system 105 including the components of the climate control circuit. The climate controller 115 may include a single integrated control unit 130 or may include a distributed network of climate controller elements 130, 135. The number of distributed control elements in a given network can depend upon the particular application of the principles of this disclosure. The measured parameters obtained by the one or more climate control sensors can be used by the climate controller 125 to control operation of the climate control system 105.

The van 100 includes an independent sensor 140. In the illustrated embodiment, the independent sensor 140 is represented as a single sensor. It will be appreciated that in other embodiments, the van 100 can include a plurality of independent sensors 140. In some embodiments, the independent sensor 140 is a dedicated regulatory sensor that can provide independent verification of climate control parameters (e.g., temperature, humidity, atmosphere, etc.) within the climate controlled space 110. The independent sensor 140 is not used by the climate controller 125 to control operation of the transport climate control system 105. The independent sensor 140 is in electronic communication with a power source (not shown) of the CCU 115. In an embodiment, the independent sensor 140 is in electronic communication with the climate controller 125 (see FIG. 3 below). It will be appreciated that the electronic communication between the independent sensor 140 and the climate controller 125 can enable network communication of the sensed verification values or parameters (e.g., temperature data of cargo stored in the climate controlled space 300) measured by the independent sensor 140. The electronic communication between the climate controller 125 and the independent sensor 140 does not enable the sensed verification values or parameters to be utilized in a control of the CCU 115.

FIG. 1B depicts the climate-controlled straight truck 150 that includes the climate controlled space 160 for carrying cargo and the transport climate control system 155. The transport climate control system 155 includes a CCU 165 that is mounted to a front wall 170 of the climate controlled space 160. The CCU 165 can include, among other components, a climate control circuit (see FIG. 2) that connects, for example, a compressor, a condenser, an evaporator, and an expansion device to provide climate control within the climate controlled space 160. In an embodiment, the CCU 165 can be a transport refrigeration unit.

The transport climate control system 155 also includes a programmable climate controller 175 and one or more climate control sensors (not shown) that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 165 into the climate controlled space 160, a return air temperature of air returned from the climate controlled space 160 back to the CCU 165, a humidity within the climate controlled space 160, etc.) and communicate climate control data to the climate controller 175. The one or more climate control sensors can be positioned at various locations outside the truck 150 and/or inside the truck 150 (including within the climate controlled space 160).

The climate controller 175 is configured to control operation of the transport climate control system 155 including components of the climate control circuit. The climate controller 175 may include a single integrated control unit 175 or may include a distributed network of climate controller elements 175, 180. The number of distributed control elements in a given network can depend upon the particular application of the principles described herein. The measured parameters obtained by the one or more climate control sensors can be used by the climate controller 175 to control operation of the climate control system 155.

The truck 150 includes an independent sensor 185. In the illustrated embodiment, the independent sensor 185 is represented as a single sensor. It will be appreciated that in other embodiments, the truck 150 includes a plurality of independent sensors 185. In some embodiments, the independent sensor 185 is a dedicated regulatory sensor that can provide independent verification of climate control parameters (e.g., temperature, humidity, atmosphere, etc.) within the climate controlled space 160. The independent sensor 185 is not used by the climate controller 175 to control operation of the transport climate control system 155. The independent sensor 185 is in electronic communication with a power source (not shown) of the CCU 165. In an embodiment, the independent sensor 185 is in electronic communication with the climate controller 175. It will be appreciated that the electronic communication between the independent sensor 185 and the climate controller 175 can enable network communication of the sensed verification values or parameters (e.g., temperature data of cargo stored in the climate controlled space 300) measured by the independent sensor 185. The electronic communication between the climate controller 175 and the independent sensor 185 does not enable the sensed verification values or parameters to be utilized in a control of the CCU 165.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 210 includes a CCU 220 that provides environmental control (e.g. temperature, humidity, air quality, etc.) within a climate controlled space 225 of the transport unit 215. The CCU 220 is disposed on a front wall 230 of the transport unit 215. In other embodiments, it will be appreciated that the CCU 220 can be disposed, for example, on a rooftop or another wall of the transport unit 215. The CCU 220 includes a climate control circuit (FIG. 2) that connects, for example, a compressor, a condenser, an evaporator, and an expansion device to provide conditioned air within the climate controlled space 225. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate controlled space 225).

The climate controller 235 is configured to control operation of the transport climate control system 210 including components of the climate control circuit. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the climate control system 210.

The climate controlled transport unit 200 includes an independent sensor 250. In the illustrated embodiment, the independent sensor 250 is represented as a single sensor. It will be appreciated that in other embodiments, the climate controlled transport unit 200 can include a plurality of independent sensors 250. In some embodiments, the independent sensor 250 is a dedicated regulatory sensor that can provide independent verification of climate control parameters (e.g., temperature, humidity, atmosphere, etc.) within the climate controlled space 225. The independent sensor 250 is not used by the climate controller 235 to control operation of the transport climate control system 210.

The independent sensor 250 is in electronic communication with a power source (not shown) of the CCU 220. In an embodiment, the independent sensor 250 is in electronic communication with the climate controller 235. It will be appreciated that the electronic communication between the independent sensor 250 and the climate controller 235 can enable network communication of the sensed verification values or parameters (e.g., temperature data of cargo stored in the climate controlled space 300) measured by the independent sensor 250. The electronic communication between the climate controller 235 and the independent sensor 250 does not enable the sensed verification values or parameters to be utilized in a control of the CCU 220.

FIG. 1D illustrates an embodiment of the climate controlled transport unit 275. The climate controlled transport unit 275 includes the multi-zone transport climate control system (MTCS) 280 for a transport unit 285 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The climate controlled space 300 can be divided into a plurality of zones 305. The term "zone" means a part of an area of the climate controlled space 300 separated by walls 310. The CCU 290 can operate as a host unit and provide climate control within a first zone 305a of the climate controlled space 300. The remote unit 295a can provide climate control within a second zone 305b of the climate controlled space 300. The remote unit 295b can provide climate control within a third zone 305c of the climate controlled space 300. Accordingly, the MTCS 280 can be used to separately and independently control environmental condition(s) within each of the multiple zones 305 of the climate controlled space 300.

The CCU 290 is disposed on a front wall 315 of the transport unit 275. In other embodiments, it will be appreciated that the CCU 290 can be disposed, for example, on a rooftop or another wall of the transport unit 275. The CCU 290 includes a climate control circuit (FIG. 2) that connects, for example, a compressor, a condenser, an evaporator, and an expansion device to provide conditioned air within the climate controlled space 300. The remote unit 295a is disposed on a ceiling 320 within the second zone 305b and the remote unit 295b is disposed on the ceiling 320 within the third zone 305c. Each of the remote units 295a, b include an evaporator (not shown) that connects to the rest of the climate control circuit provided in the CCU 290. In an embodiment, the CCU 290 can be a transport refrigeration unit.

The MTCS 280 also includes a programmable climate controller 325 and one or more climate control sensors (not shown) that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors can be positioned at various locations outside the transport unit 275 and/or inside the transport unit 275 (including within the climate controlled space 300).

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein. The measured parameters obtained by the one or more climate control sensors can be used by the climate controller 325 to control operation of the MTCS 280.

The climate controlled transport unit 275 includes an independent sensor 340. In the illustrated embodiment, the independent sensor 340 is represented as a single sensor. It will be appreciated that in other embodiments, the climate controlled transport unit 275 can include a plurality of independent sensors 340. In some embodiments, the independent sensor 340 is a dedicated regulatory sensor that can provide independent verification of climate control parameters (e.g., temperature, humidity, atmosphere, etc.) within the climate controlled space 300. The independent sensor 340 is not used by the climate controller 325 to control operation of the MTCS 280.

The independent sensor 340 is in electronic communication with a power source (not shown) of the CCU 290. In an embodiment, the independent sensor 340 is in electronic communication with the climate controller 325. It will be appreciated that the electronic communication between the independent sensor 340 and the climate controller 325 can enable network communication of the sensed verification values or parameters (e.g., temperature data of cargo stored in the climate controlled space 300) measured by the independent sensor 340. The electronic communication between the climate controller 325 and the independent sensor 340 does not enable the sensed verification values or parameters to be utilized in a control of the CCU 290. Additional details about the controls are discussed in additional detail in accordance with FIG. 4 below.

In an embodiment, a CCU (e.g., the CCU in FIGS. 1A-1D) can be an electrically powered climate control unit. Also, in an embodiment, the CCU can include a rechargeable energy storage device (not shown) that can provide power to a transport climate control system (e.g., the transport climate control systems in FIGS. 1A-1D). In an embodiment, the rechargeable energy storage device can be charged by AC power (e.g., three-phase AC power, single phase AC power, etc.). In an embodiment, the rechargeable energy storage device can be charged by DC power.

Figure 2:
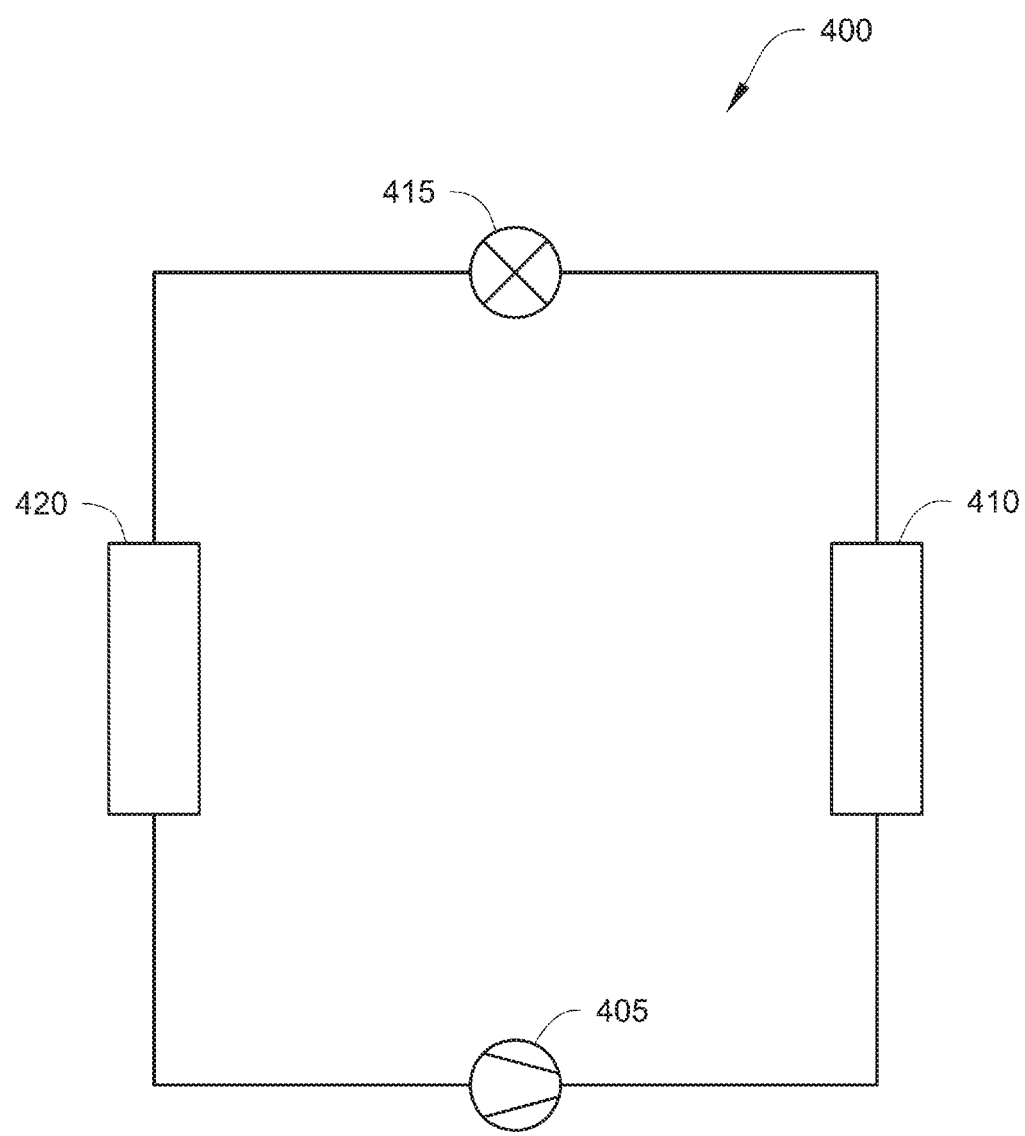
FIG. 2 is a schematic diagram of a climate control circuit, according to an embodiment.

FIG. 2 is a schematic diagram of a climate control circuit 400, according to some embodiments. The climate control circuit 400 generally includes a compressor 405, a condenser 410, an expansion device 415, and an evaporator 420. The compressor 405 can be, for example, a scroll compressor, a reciprocal compressor, or the like. In some embodiments, the compressor 405 can be a mechanically driven compressor. In other embodiments, the compressor 405 can be an electrically driven compressor.

The climate control circuit 400 is exemplary and can be modified to include additional components. For example, in some embodiments the climate control circuit 400 can include an economizer heat exchanger, one or more flow control devices (e.g., valves or the like), a receiver tank, a dryer, a suction-liquid heat exchanger, or the like.

The climate control circuit 400 can generally be applied in a variety of systems used to control an environmental condition (e.g., temperature, humidity, air quality, or the like) in a space (generally referred to as a climate controlled space). Examples of systems include, but are not limited to the climate control systems shown and described above in accordance with FIGS. 1A-1D.

The components of the climate control circuit 400 are fluidly connected. The climate control circuit 400 can be specifically configured to be a cooling system (e.g., an air conditioning system) capable of operating in a cooling mode. Alternatively, the climate control circuit 400 can be specifically configured to be a heat pump system which can operate in both a cooling mode and a heating/defrost mode.

Climate control circuit 400 operates according to generally known principles. The climate control circuit 400 can be configured to heat or cool heat transfer fluid or medium (e.g., a gas such as, but not limited to, air or the like), in which case the climate control circuit 400 may be generally representative of an air conditioner or heat pump.

In operation, the compressor 405 compresses a heat transfer fluid (e.g., refrigerant or the like) from a relatively lower pressure gas to a relatively higher-pressure gas. The relatively higher-pressure and higher temperature gas is discharged from the compressor 405 and flows through the condenser 410. In accordance with generally known principles, the heat transfer fluid flows through the condenser 10 and rejects heat to a heat transfer fluid or medium (e.g., air, etc.), thereby cooling the heat transfer fluid. The cooled heat transfer fluid, which is now in a liquid form, flows to the expansion device 415 (e.g., an expansion valve or the like). The expansion device 415 reduces the pressure of the heat transfer fluid. As a result, a portion of the heat transfer fluid is converted to a gaseous form. The heat transfer fluid, which is now in a mixed liquid and gaseous form flows to the evaporator 420. The heat transfer fluid flows through the evaporator 420 and absorbs heat from a heat transfer medium (e.g., air, etc.), heating the heat transfer fluid, and converting it to a gaseous form. The gaseous heat transfer fluid then returns to the compressor 405. The above-described process continues while the heat transfer circuit is operating, for example, in a cooling mode (e.g., while the compressor 405 is enabled).

Figure 3:
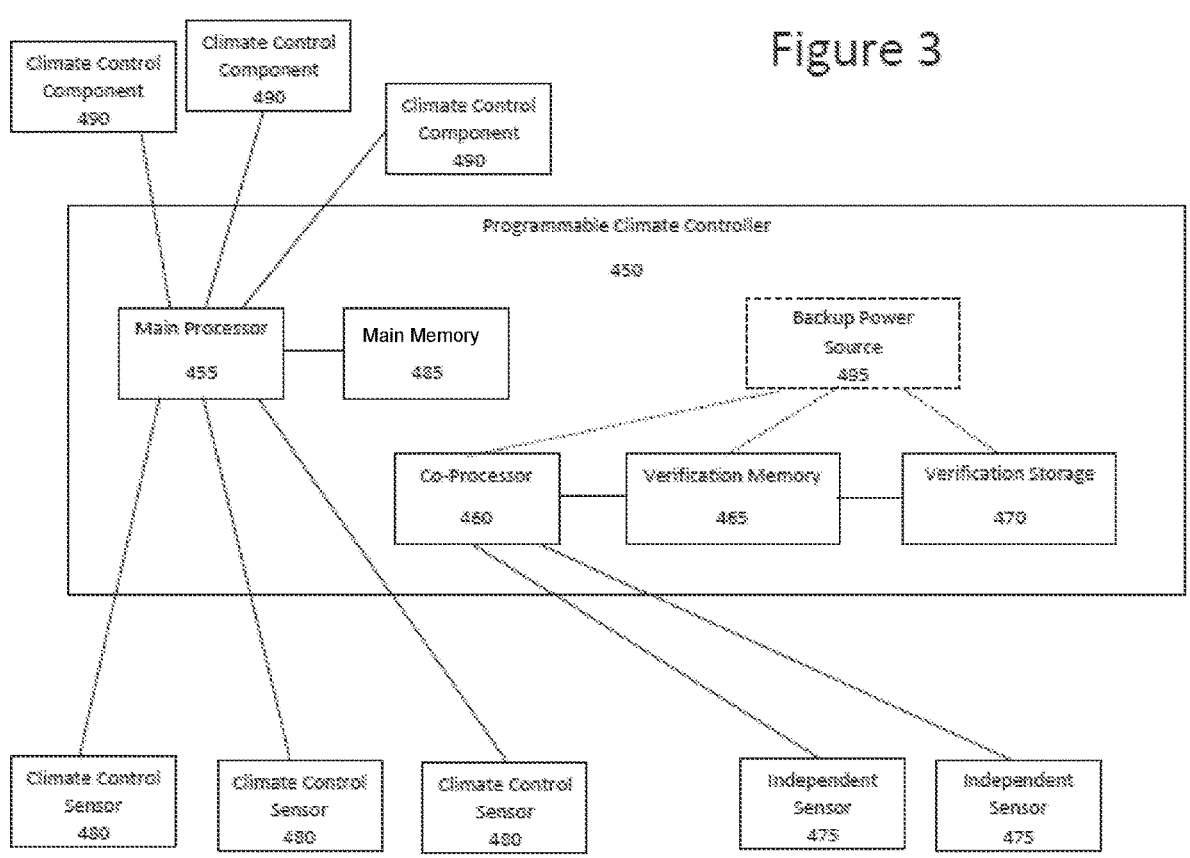
FIG. 3 is a schematic diagram of a programmable climate controller, according to an embodiment.

FIG. 3 is a schematic diagram of a programmable climate controller 450, according to an embodiment. The programmable climate controller 450 can be utilized as the programmable climate controller in any of the above systems shown in FIGS. 1A-1D.

The programmable climate controller 450 includes a main processor 455 and a co-processor 460 that is separate and independent from the main processor 455. The main processor 455 generally controls the temperature specific control for the CCU (e.g., as shown and described in FIGS. 1A-2 above) in the transport climate control system. The main processor 455 is connected in electronic communication to a main memory 485 within the controller 450 and to a plurality of climate control components 490 outside of the controller 450. The main processor 455 monitors and obtains climate control data (e.g., temperature, humidity, pressure, etc.) from a plurality of climate control sensors 480 and stores the climate control data into the main memory 485. Based on the climate control data obtained from the climate control sensors 480, the main processor can provide operation instructions to the plurality of climate control components 490. The plurality of climate control components 490 are part of the transport climate control system and can include, for example, a compressor, fan(s), blower(s), valve(s), etc. It will be appreciated that the main processor 455 can be electronically connected to other portions of the transport climate control system not described herein (e.g., a telematics unit, a battery charger, etc.).

The co-processor 460 is dedicated to monitoring the independent sensors 475 (e.g., a dedicated regulatory temperature sensor). In some embodiments, the independent sensors 475 can transmit verification data to the co-processor 460 via a dedicated bus (e.g., a dedicated serial peripheral interface (SPI) bus). The co-processor 460 is separate from the main processor 455 so that there is a separation in the hardware between the two processors 455, 460. Separate, as used in this Specification, means that the two processors 455, 460 are different processor chips. The processors 455, 460 can be included in a single housing. Further, main processor 455 and co-processor 460 can be electrically connected to provide selective communication between the two processors 455, 460.

Specifically, the co-processor 460 is separate from the main processor 455 so that the functionality of monitoring the temperatures within the transport unit is separate and distinct from the control of the climate control system. The co-processor 460 can include other functions as well, so long as they are not related to the control of the climate control system. For example, the co-processor 460 can also serve a function of controlling the various communications within the controller 450. For example, the co-processor 460 can manage controller area network (CAN) communications for the programmable climate controller 450.

The co-processor 460 is connected in electronic communication to a verification memory 465 and a verification storage 470. The co-processor 460 is also connected in electronic communication to the independent sensors 475. The independent sensors 475 can monitor and obtain verification data such as, for example, temperature data of temperature-sensitive cargo during transport. While FIG. 3 shows two independent sensors 475, it will be appreciated that in other embodiments there may be only a single independent sensor 475 or three or more independent sensors 475.

As shown in FIG. 3, the climate control sensors 480 only communicate climate control data to the main processor 455 and not to the co-processor 460. Similarly, the independent sensors 475 only communicate verification data to the co-processor 460 and not the main processor 455.

The verification memory 465 and the verification storage 470 are dedicated to the co-processor 460. In an embodiment, this can help ensure that verification data retrieved from the independent temperature sensors 475 is separated from other temperature data that may be logged in the control of the climate control system. In an embodiment, the data can be temporarily stored in the verification memory 465, and then at particular intervals transferred to the verification storage 470. The verification storage 470 can be onboard the controller 450, or separate from the controller 450. The verification data retrieved from the independent temperature sensors 475 can be maintained in tuples composed of both temperature and timestamp data to ensure integrity of the data (e.g., to make sure the data is not changed). A tuple is a finite ordered list of elements and can be utilized to ensure that temperature readings and timestamps are associated with each other. By way of example, a tuple containing temperature data can be stored as "(temperature reading 1, timestamp 1, temperature reading 2, timestamp 2, temperature reading n, timestamp n . . . )". To ensure the integrity of the verification data, a backup power source 495 (e.g., a capacitor, battery or the like) can be connected to one or more of the co-processor 460, the verification memory 465 and the storage 450 to ensure that no verification data is lost during transport. That is, the backup power source 495 can provide power to one or more of the co-processor 460, the verification memory 465 and the storage 450 when, for example, power to the controller 450 (e.g., from a primary power source of the controller 450) is not available. While the backup power source 495 is shown as part of the controller 450, in other embodiments the backup power source can be external and separate from the controller 450. Further, the verification data in the verification memory 465 and the verification storage 470 is maintained in a non-editable format so that the verification data cannot be manipulated.

Accordingly, the controller 450 can ensure that verification data is properly tracked and maintained and remains separate from the climate control data use to control the transport climate control system, thereby ensuring integrity of the verification data to meet, for example, regulatory requirements.

Aspects. It is noted that any of aspects 1-5 can be combined with any one of aspects 6-11.

Aspect 1. A controller for a transport climate control system, comprising:

a main processor configured to control operation of a compressor of the transport climate control system;

a co-processor separate from the main processor; and a verification memory connected in electronic communication with only the co-processor and not in electronic communication with the main processor, wherein the co-processor is configured to receive verification data from an independent sensor and wherein the independent sensor is not in communication with the main processor.

Aspect 2. The controller of aspect 1, further comprising:

a verification storage in electronic communication with the verification memory, the verification storage configured to receive the verification data received from the independent sensor.

Aspect 3. The controller of any one of aspects 1-2, further comprising a backup power source that is configured to provide power to at least one of the co-processor and the verification memory when power to the controller is not available.

Aspect 4. The controller of any one of aspects 1-3, wherein the main processor is configured to receive climate control data from a climate control sensor and is configured to control operation of the transport climate control system based on the climate control data received from the climate control sensor.

Aspect 5. The controller of any one of aspects 1-4, wherein a primary power source provides power to the controller including the main processor and the co-processor.

Aspect 6. The controller of any one of aspects 1-5, wherein the verification data includes temperature data and the co-processor is configured to receive temperature data from the independent sensor.

Aspect 7. A transport climate control system that provides climate control to a climate controlled space of a transport unit, comprising:

a compressor;

a plurality of sensors including a climate control sensor and an independent sensor;

a controller that includes:

a main processor configured to control operation of the compressor of the transport climate control system;

a co-processor separate from the main processor; and a verification memory connected in electronic communication with only the co-processor of the co-processor and not in electronic communication with the main processor, wherein the co-processor is configured to receive verification data from the independent sensor and wherein the independent sensor is not in communication with the main processor.

Aspect 8. The transport climate control system of aspect 7, wherein the controller includes a verification storage in electronic communication with the verification memory, wherein the verification storage is configured to receive the verification data received from the independent sensor.

Aspect 9. The transport climate control system of any one of aspects 7-8, further comprising a backup power source that is configured to provide power to at least one of the co-processor and the verification memory when power to the controller is not available.

Aspect 10. The transport climate control system of any one of aspects 7-9, wherein the climate control sensor monitors and obtains climate control data for the transport climate control system, and wherein the main processor is configured to receive the climate control data from the climate control sensor and is configured to control operation of the transport climate control system based on the climate control data received from the climate control sensor.

Aspect 11. The transport climate control system of aspect 10, wherein the main processor is configured to control operation of the compressor based on the climate control data from the climate control sensor.

Aspect 12. The transport climate control system of any one of aspects 7-11, further comprising a primary power source that provides power to the controller including the main processor and the co-processor.

Aspect 13. The transport climate control system of any one of aspects 7-12, wherein the verification data includes temperature data and the co-processor is configured to receive temperature data from the independent sensor.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A controller for a transport climate control system, comprising:

a main processor configured to control operation of a compressor of the transport climate control system;

a co-processor separate from the main processor; and a verification memory connected in electronic communication with only the co-processor and not in electronic communication with the main processor, wherein the co-processor is configured to receive verification data from an independent sensor, wherein the independent sensor is not in communication with the main processor, wherein the independent sensor is not used by the controller to control operation of the transport climate control system, and wherein electronic communication between the controller and the independent sensor does not enable sensed verification values or parameters to be utilized in control of a climate control unit of the transport climate control system.

2. The controller of claim 1, further comprising:

a verification storage in electronic communication with the verification memory, the verification storage configured to obtain the verification data received from the independent sensor.

3. The controller of claim 1, further comprising a backup power source that is configured to provide power to at least one of the co-processor and the verification memory when power to the controller is not available.

4. The controller of claim 1, wherein the main processor is configured to receive climate control data from a climate control sensor and is configured to control operation of the transport climate control system based on the climate control data received from the climate control sensor.

5. The controller of claim 1, wherein a primary power source provides power to the controller including the main processor and the co-processor.

6. The controller of claim 1, wherein the verification data includes temperature data and the co-processor is configured to receive temperature data from the independent sensor.

7. A transport climate control system that provides climate control to a climate controlled space of a transport unit, comprising:
a compressor;
a plurality of sensors including a climate control sensor and an independent sensor;
a controller that includes:
a main processor configured to control operation of the compressor of the transport climate control system;
a co-processor separate from the main processor; and
a verification memory connected in electronic communication with only the co-processor of the co-processor and not in electronic communication with the main processor,
wherein the co-processor is configured to receive verification data from the independent sensor and wherein the independent sensor is not in communication with the main processor,
wherein the independent sensor is not used by the controller to control operation of the transport climate control system, and wherein electronic communication between the controller and the independent sensor does not enable sensed verification values or parameters to be utilized in control of a climate control unit of the transport climate control system.

8. The transport climate control system of claim 7, wherein the controller includes a verification storage in electronic communication with the verification memory, wherein the verification storage is configured to obtain the verification data received from the independent sensor.

9. The transport climate control system of claim 7, further comprising a backup power source that is configured to provide power to at least one of the co-processor and the verification memory when power to the controller is not available.

10. The transport climate control system of claim 7, wherein the climate control sensor monitors and obtains climate control data for the transport climate control system, and
wherein the main processor is configured to receive the climate control data from the climate control sensor and is configured to control operation of the transport climate control system based on the climate control data received from the climate control sensor.

11. The transport climate control system of claim 10, wherein the main processor is configured to control operation of the compressor based on the climate control data from the climate control sensor.

12. The transport climate control system of claim 7, further comprising a primary power source that provides power to the controller including the main processor and the co-processor.

13. The transport climate control system of claim 7, wherein the verification data includes temperature data and the co-processor is configured to receive temperature data from the independent sensor.

14. The controller of claim 2, wherein the verification data is temporarily stored in the verification memory and then transferred at periodic intervals to the verification storage.

15. The controller of claim 1, wherein the verification data is maintained in one or more tuples composed of both temperature data and timestamp data to ensure integrity of the verification data, wherein each of the one or more tuples is a finite ordered list of elements such that a temperature reading of the temperature data and a corresponding timestamp of the timestamp data are associated with each other.

16. The transport climate control system of claim 8, wherein the verification data is temporarily stored in the verification memory and then transferred at periodic intervals to the verification storage.

17. The transport climate control system of claim 7, wherein the verification data is maintained in one or more tuples composed of both temperature data and timestamp data to ensure integrity of the verification data, wherein each of the one or more tuples is a finite ordered list of elements such that a temperature reading of the temperature data and a corresponding timestamp of the timestamp data are associated with each other.

* * * * *